United States Patent
Larchar

(10) Patent No.: US 11,549,321 B2
(45) Date of Patent: Jan. 10, 2023

(54) PARALLEL SHAKER ASSEMBLY FOR DRILLING FLUID WASTE DISPOSAL

(71) Applicant: Milestone Environmental Services, LLC., Houston, TX (US)

(72) Inventor: Jason Larchar, Spring, TX (US)

(73) Assignee: MILESTONE ENVIRONMENTAL SERVICES, LLC, Houston, TX (US)

(*) Notice: Subject to any disclaimer, the term of this patent is extended or adjusted under 35 U.S.C. 154(b) by 67 days.

(21) Appl. No.: 17/131,987

(22) Filed: Dec. 23, 2020

(65) Prior Publication Data
US 2021/0189812 A1 Jun. 24, 2021

Related U.S. Application Data

(60) Provisional application No. 62/953,296, filed on Dec. 24, 2019.

(51) Int. Cl.
| | |
|---|---|
| *E21B 21/06* | (2006.01) |
| *E21B 41/00* | (2006.01) |
| *C02F 1/34* | (2006.01) |
| *B01D 21/28* | (2006.01) |
| *C02F 103/10* | (2006.01) |

(52) U.S. Cl.
CPC .......... *E21B 21/065* (2013.01); *B01D 21/283* (2013.01); *C02F 1/34* (2013.01); *E21B 21/062* (2013.01); *E21B 41/005* (2013.01); *C02F 2103/10* (2013.01)

(58) Field of Classification Search
CPC .... E21B 21/065; E21B 21/062; E21B 41/005; E21B 21/066; E21B 41/0057; B01D 21/283; B01D 21/0012; B01D 2221/04; C02F 1/34; C02F 2103/10
See application file for complete search history.

(56) References Cited

U.S. PATENT DOCUMENTS

| | | | | |
|---|---|---|---|---|
| 2,817,440 A | * | 12/1957 | Casner | E21B 21/065 |
| | | | | 209/208 |
| 7,296,640 B2 | * | 11/2007 | Tettleton | E21B 21/065 |
| | | | | 175/207 |
| 2001/0027168 A1 | * | 10/2001 | Adams | E21B 21/062 |
| | | | | 507/117 |
| 2002/0162807 A1 | * | 11/2002 | Kulbeth | B01D 21/2461 |
| | | | | 210/804 |
| 2015/0375145 A1 | * | 12/2015 | Sherwood | B07B 11/04 |
| | | | | 210/780 |

* cited by examiner

*Primary Examiner* — Tara Schimpf
*Assistant Examiner* — Nicholas D Wlodarski
(74) *Attorney, Agent, or Firm* — MH2 Technology Law Group LLP

(57) ABSTRACT

A shaker assembly and method, of which the shaker assembly includes a shaker tank, a mixing tank in fluid communication with the shaker tank and positioned adjacent thereto, an overflow weir positioned between and separating the shaker tank and the mixing tank, a first shaker positioned over the shaker tank, and a second shaker. The first and second shakers are configured to operate in parallel to partially separate a solid from a liquid of a drilling waste fluid. During normal operation, at least some of the liquid flows from the first and second shakers to the shaker tank, and from the shaker tank over the overflow weir and into the mixing tank.

20 Claims, 11 Drawing Sheets

PARALLEL SHAKER ASSEMBLY FOR DRILLING FLUID WASTE DISPOSAL

CROSS-REFERENCE TO RELATED APPLICATIONS

This application claims priority to U.S. Provisional Patent Application having Ser. No. 62/953,296, which was filed on Dec. 24, 2019 and is incorporated herein by reference in its entirety.

BACKGROUND

When drilling a wellbore in a subterranean formation, a fluid is pumped down into the wellbore to cool the drill bit and to circulate cuttings from the subterranean formation back to the surface. This fluid with cuttings is referred to as a drilling fluid waste. The drilling fluid waste may present additional environmental liabilities and be expensive to dispose of at the surface. As a result, it may be desirable to dispose of the drilling fluid waste by pumping the drilling fluid waste back into the subterranean formation.

The drilling fluid waste may first be treated, e.g., to remove solids from the drilling fluid waste that might otherwise fall out of suspension in the drilling fluid waste. These solids are removed in several ways, and potentially through multiple mechanisms in series. A shaker is one such mechanism that is used to remove solids from drilling fluid waste. The drilling fluid waste is sent to the shaker, where it runs across a vibrating screen, which removes solids that are larger than the size of the screen mesh, while allowing fluids and smaller particles to exit.

SUMMARY

Embodiments of the disclosure include a shaker assembly that includes a shaker tank, a mixing tank in fluid communication with the shaker tank and positioned adjacent thereto, an overflow weir positioned between and separating the shaker tank and the mixing tank, a first shaker positioned over the shaker tank, and a second shaker. The first and second shakers are configured to operate in parallel to partially separate a solid from a liquid of a drilling waste fluid. During normal operation, at least some of the liquid flows from the first and second shakers to the shaker tank, and from the shaker tank over the overflow weir and into the mixing tank.

Embodiments of the disclosure also include a method for disposing of drilling fluid waste. The method includes receiving the drilling fluid waste in a receiving pit, and receiving at least a portion of the drilling fluid waste from the receiving pit into a first shaker and a second shaker of a shaker assembly. The shaker assembly further includes a shaker tank, a mixing tank in fluid communication with the shaker tank and positioned adjacent thereto, and an overflow weir positioned between and separating the shaker tank and the mixing tank. The first shaker is positioned over the shaker tank, and the first and second shakers are configured to operate in parallel to separate a solid from a liquid of the drilling waste fluid. The method also includes receiving the liquid from the first and second shakers into the shaker tank, and receiving the liquid from the shaker tank into the mixing tank. The liquid from the shaker tank flows over the overflow weir and into the mixing tank. The method further includes mixing the liquid in the mixing tank, and pumping the liquid into a disposal well.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
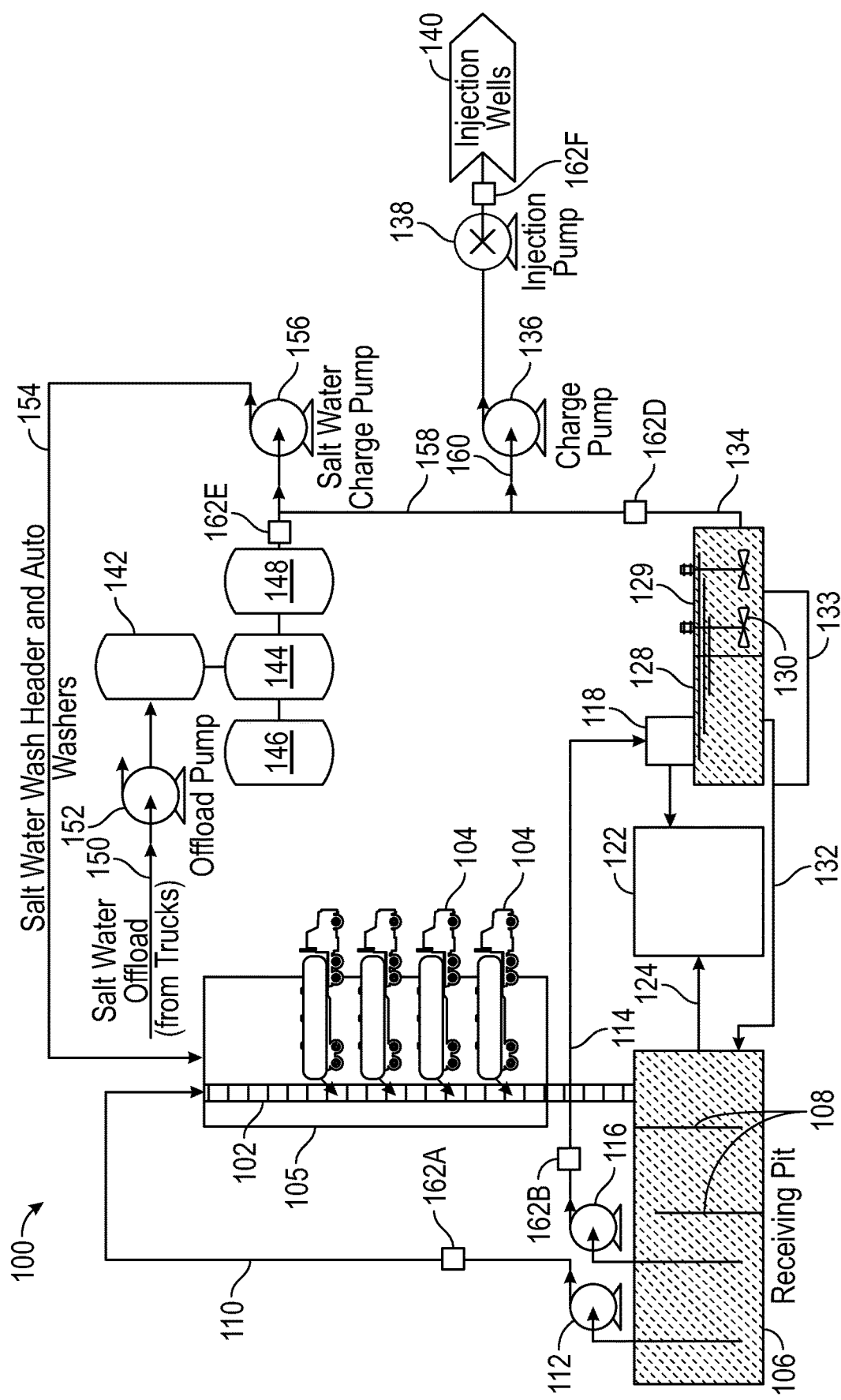
FIG. 1 illustrates a schematic view of a fluid disposal injection system, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. The embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Finally, unless otherwise provided herein, "or" statements are intended to be non-exclusive; for example, the statement "A or B" should be considered to mean "A, B, or both A and B."

FIG. 1 illustrates a schematic view of a fluid disposal injection system 100, according to an embodiment. The system 100 may be used to treat and subsequently inject a drilling fluid waste into an injection or "disposal" well in a subterranean formation. The system 100 may include a trench 102 configured to receive a drilling fluid waste from a wellbore. The drilling fluid waste may include cuttings (e.g., clay), water, hydrocarbons, chemicals introduced into the wellbore, or a combination thereof. The trench 102 may include a grate or other screening device that may be configured to allow one or more vehicles (e.g., trucks) 104 to drive over the trench 102, enabling a pull-through arrangement in the receiving area 105, rather than a back-in. Thus, as shown, the drilling fluid waste may be transported from the wellbore to the trench 102 via the one or more trucks 104. In another embodiment, the drilling fluid waste may be transported from the wellbore to the trench 102 via a pipeline.

The system 100 may also include a receiving pit 106 that may receive the drilling fluid waste from the trench 102. The receiving pit 106 may include one or more weirs 108 that form a tortuous path through the receiving pit 106, which may serve to mix the drilling fluid waste into a substantially homogeneous state. A portion of the drilling fluid waste in the receiving pit 106 may be transferred (e.g., through line 110 via pump 112) back to the trench 102 where the drilling fluid waste may be used to create a slurry in the trench 102 to help the solids flow into the receiving pit 106 rather than accumulate in the trench 102. Another portion of the drilling fluid waste in the receiving pit 106 may be transferred (e.g., through line 114 via pump 116) to a shaker 118, a shaker tank 128, and a mixing tank 129. The shaker tank 128 and the mixing tank 129 may be provided as a single tank, e.g., with a partition therebetween, as shown, and as also described in greater detail below.

The shaker 118 may be or include a shale shaker, a centrifuge, a filter, a strainer basket, a sieve, or the like. The shaker 118 may filter/separate solids (e.g., particles) from the drilling fluid waste, thereby producing a removed set of solids (e.g., particles) and a separated drilling fluid waste. In some embodiments, the shaker 118 may be provided by or otherwise representative of several shakers 118 operating in parallel, as will be explained in greater detail below. With respect to the shakers 118, "operating in parallel" means that the shakers 118 are not downstream from one another, but receive fluid from a common or adjoined inlet (e.g., a header) and provide separated fluid to a common or adjoined outlet. The solids separated by the shaker 118 may have a maximum cross-sectional dimension that is greater than about 100 microns, greater than about 200 microns, greater than about 300 microns, greater than about 400 microns, greater than about 500 microns, or larger. The size of the solids to be removed may be determined by formation properties, anticipated pumping schedules, and/or injection modeling software. For example, formations of higher porosity (e.g., >20%) can tolerate solids particles upwards of 1,000 microns, while formations of lower porosity (e.g., <10%) can tolerate fine particles less than 100 microns. In one example, the size of the solids may be determined by analyzing the formation porosity from gamma-ray emitting tools from open-hole logs and coordinating the porosity of a disposal well with an appropriate classification size.

The removed set of solids output from the shaker 118 may be transferred (e.g., through line 120) to a drying slab 122. The solids may then be ground into smaller particle sizes and introduced into the receiving pit 106, the shaker 118, and/or the mixing tank 129. In another embodiment, the solids may be introduced into a centrifuge (e.g., the shaker 118) for dewatering. In yet another embodiment, the solids may be transported to a landfill.

In at least one embodiment, at least a portion of the solids in the drilling fluid waste in the receiving pit 106 may bypass the shaker 118 and be transferred (e.g., through line 124) to the drying slab 122. More particularly, the solids that settle on the bottom of the receiving pit 106 may bypass the shaker 118 and be transferred to the drying slab 122.

The separated drilling fluid waste (now having a higher liquid concentration) from the shaker 118 may be received in the shaker tank 128, where it may settle. By gravity separation, at least a portion of remaining solid sediment in the drilling fluid waste may settle to the bottom of the shaker tank 128, and then may be transferred, e.g., as a slurry, back into the receiving pit 106 via line 132. The drilling waste fluid that is not pumped back into the receiving pit 106 via line 132 may pass to the mixing tank 129.

The mixing tank 129 may include one or more mixers 130 that stir/mix the separated drilling fluid waste in the mixing tank 129 into a substantially homogeneous state. In at least one embodiment, one or more chemical additives may be added to the separated drilling fluid waste in the mixing tank 129. Although a single mixing tank 129 is shown, in other embodiment, a plurality of mixing tanks may be utilized. One or more of the additional mixing tanks may not have associated shakers (e.g., such as shaker 118).

In at least one embodiment, at least a portion of the separated drilling fluid waste may be transferred (e.g., via line 133) from the mixing tank 129 back into the receiving pit 106 to provide overflow protection (e.g., to prevent the mixing tank 129 from overflowing) and/or provide recirculation to clean the receiving pit 106. At least a portion of the separated drilling fluid waste may be transferred (e.g., through line 134 via one or more pumps 136, 138) into a well 140. The pump 136 may be or include a charge pump, and the pump 138 may be or include an injection pump. The well 140 may be or include a disposal well (also referred to as an injection well).

The system 100 may also include a plurality of tanks (four are shown: 142, 144, 146, 148). Water may be introduced into the first tank 142 (e.g., through line 150 via an offload pump 152). The water may be introduced from one or more of the trucks 104. The water may be fresh water, salt water, brackish water, brine, or the like. The first tank 142 may be or include a de-sanding or buffer tank that is configured to separate solids (e.g., particles) such as sand from the water to produce a first separated water. The first separated water may be transferred into the second tank 144.

The second tank 144 may be or include a skim tank (also referred to as a gunbarrel tank) that is configured to separate oil from the first separated water to produce a second separated water. The oil may be transferred from the second tank 144 to the third tank 146, and the second separated water may be transferred from the second tank 144 to the fourth tank 148.

At least a portion of the second separated water may be transferred (e.g., through line 154 via pump 156) back to the trench 102 and/or the trucks 104. For example, the second separated water may be sprayed onto the trench 102 and/or in the trucks 104 (e.g., by one or more sprinklers, automated tank cleaners, or hoses and valves) to clean or otherwise remove buildup of the drilling fluid waste and solids. At least a portion of the second separated water may be transferred (e.g., through lines 158, 160 via pumps 136, 138) to the well 140.

The system 100 may also include one or more sensors (six are shown: 162A-F). The first sensor 162A may be configured to measure one or more properties of the drilling fluid waste flowing from the receiving pit 106 to the trench 102 in line 110. The second sensor 162B may be configured to measure one or more properties of the drilling fluid waste flowing from the receiving pit 106 to the shaker 118 in line 114. The third sensor 162C may be configured to measure one or more properties of the separated drilling fluid waste flowing from the shaker 118 to the mixing tank 129 in line 126. The fourth sensor 162D may be configured to measure one or more properties of the separated drilling fluid waste flowing from the mixing tank 129 to the well 140 in line 134. The fifth sensor 162E may be configured to measure one or more properties of the second separated water flowing from the fourth tank 148 to the well 140 in line 158. The sixth sensor 162F may be configured to measure one or more properties of the separated drilling fluid waste, the second separated water, or a combination/mixture thereof flowing to the well 140 in line 160. The properties may be or include flowrate, viscosity, density, pH level, percentage of solids, size of solids, pressure, temperature, or a combination thereof. A flowrate of the separated drilling fluid waste in line 134 and/or the second separated water in line 158 may be modified to obtain the desired ratio of the mixture for injection into the well 140. The ratio of the separated drilling fluid waste to the second separated water may be from about 10:1 to about 5:1, about 5:1 to about 3:1, about 3:1 to about 1:1, about 1:1 to about 1:3, about 1:3 to about 1:5, or about 1:5 to about 1:10. In another embodiment, the separated drilling fluid waste may be pumped into the well 140 before and/or after the second separated water, such that the separated drilling fluid waste and the second separated water are not combined/mixed prior to being pumped in to the well 140.

Figure 2:
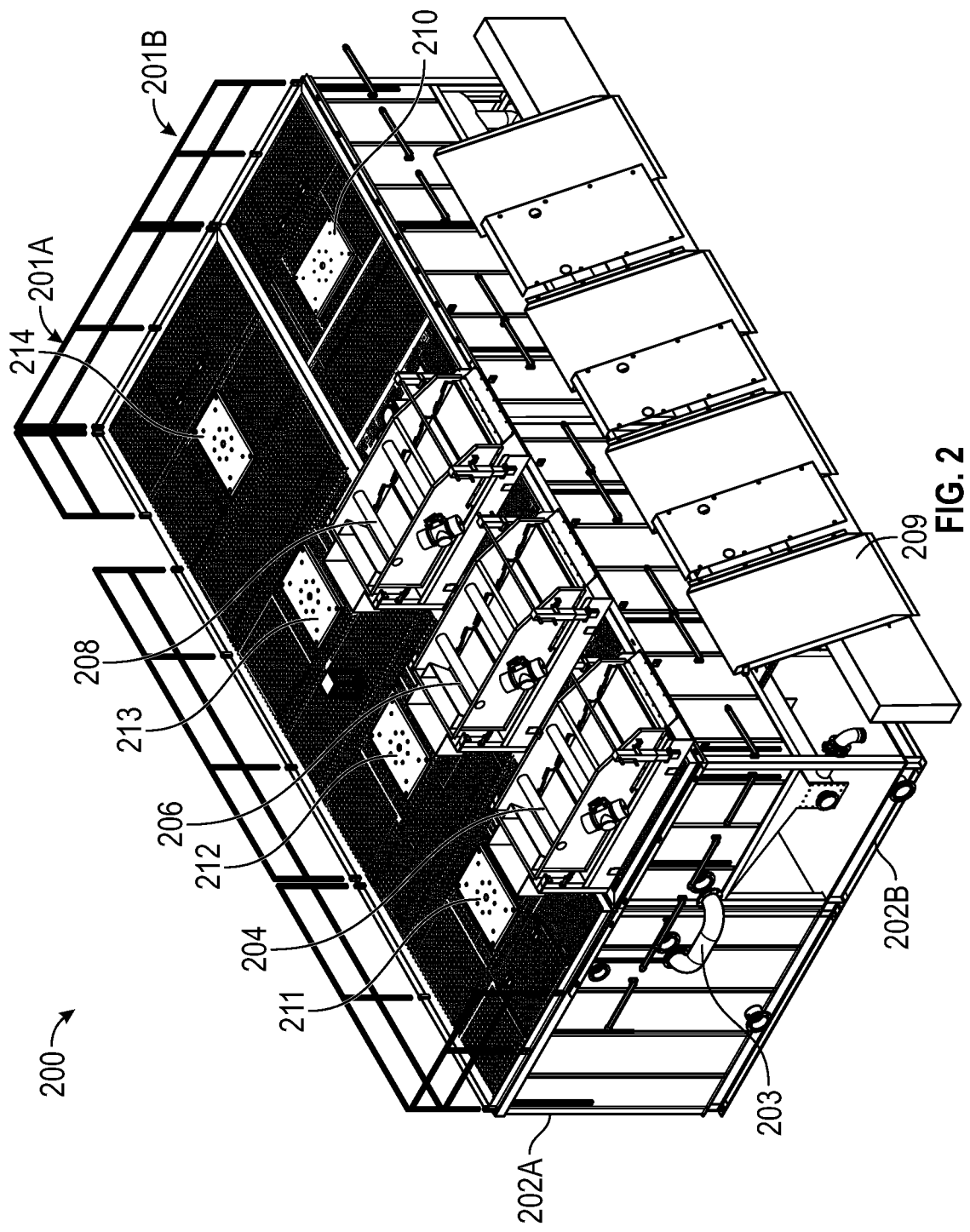
FIG. 2 illustrates a raised perspective, partially exploded view of a mixing and shaking system, according to an embodiment.

FIG. 2 illustrates a perspective view of a combined shaker and mixing system 200, according to an embodiment. The system 200 may be used as part of the system 100 described above with reference to FIG. 1, e.g., providing the shaker 118, the shaker tank 128, and/or the mixing tank 129.

In this view, it can be seen that the system 200 includes a mixing assembly 201A and a shaker assembly 201B, which may be disposed in parallel and connected together. For example, mixing assembly 201A may be packaged as a skid 202A (e.g., supported by a welded metal frame), and the shaker assembly 201B may be contained as a skid 202B. The skids 202A, 202B may be connected together. Further, the mixing assembly 201A and the shaker assembly 201B may be in fluid communication with one another via one or more crossovers (one visible: 203), such that liquid, liquid-solid slurry, etc., may flow from the shaker assembly 201B to the mixing assembly 201A or vice versa. In some embodiments, the crossover 203 may be located proximal to a top of the mixing assembly 201B for reasons that will be discussed in greater detail below.

The shaker assembly 201B may include one or more shakers (three are shown: 204, 206, 208), which may operate in parallel. That is, fluid may be delivered thereto in parallel via a manifold, rather than delivering the fluid sequentially through each of the shakers 204-208 in series, one after another. Separated particulate matter may be received via ramps 209 and directed into a receptacle, conduit, and/or directly into a drying slab 122 (FIG. 1).

The shaker assembly 201B may also include one or more mixer mounts (one is visible: 210), to which a mixer may be attached, as will be described in greater detail below. Similarly, the mixing assembly 201A may include one or more mixer mounts (four are shown: 211, 212, 213, 214), to which one or more mixers may be mounted.

Figure 3:
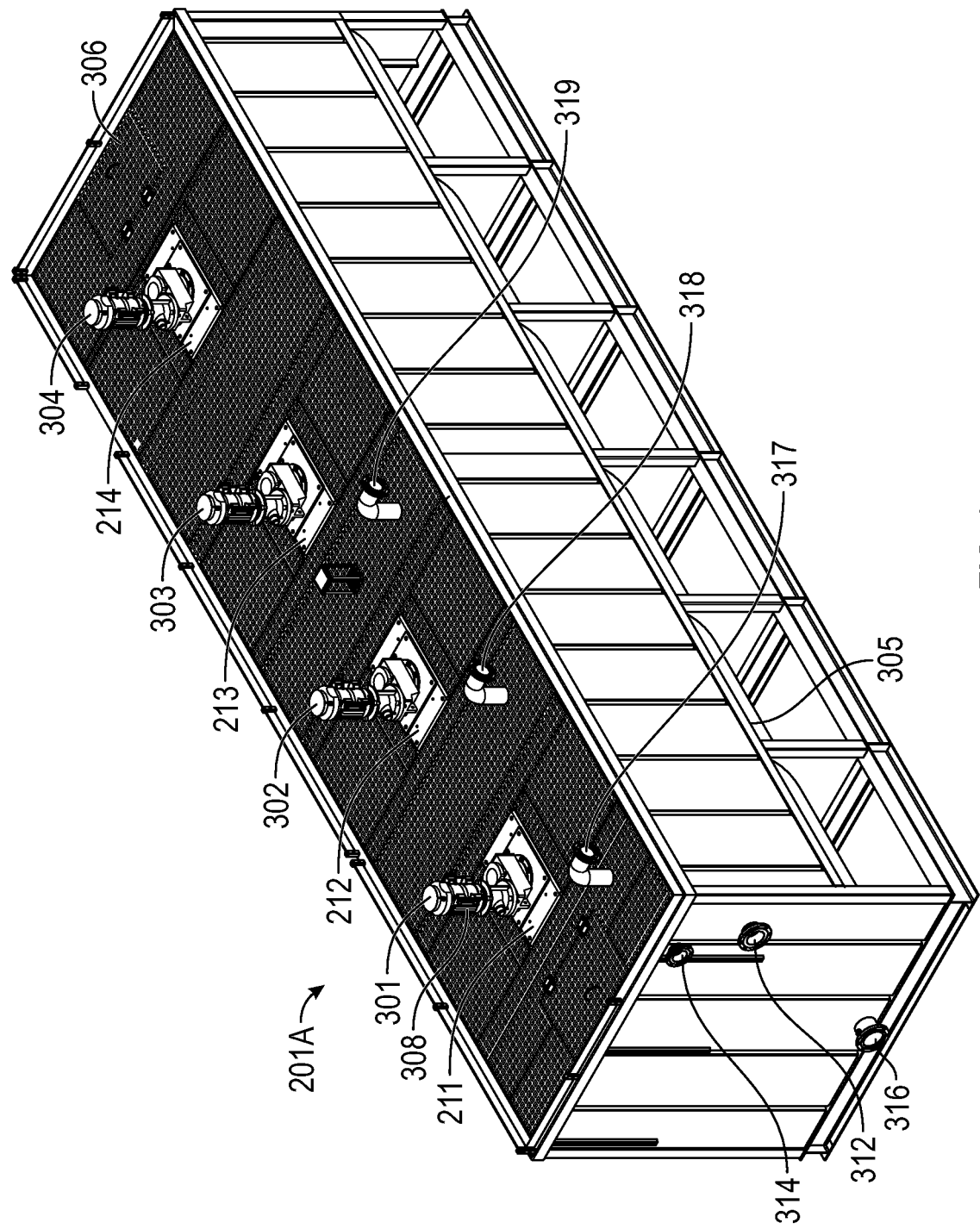
FIG. 3 illustrates a raised perspective view of a mixing assembly, according to an embodiment.

FIG. 3 illustrates a perspective view of the mixing assembly 201A, separate from the shaker assembly 201B, according to an embodiment. As illustrated, the mixing assembly 201A may include one or more mixers (four shown: 301, 302, 303, 304). The mixers 301-304 may be mounted to a top 306 of the mixing assembly 201A, specifically, mounted to the mixer mounts 211-214, and may extend downward into a mixing tank 305, as will be described in greater detail below. For example, a motor 308 of each of the mixers 301-304 may extend upwards from the top 306, and may be mounted to a mounting plate 310. Shafts (not visible in FIG. 3) of the individual mixers 301-304 may extend downward, through the respective mount plates 211-214, and into the mixing tank 305.

The mixing assembly 201A further includes a crossover connection 312, an inlet 314, and an outlet 316. The outlet 316 may be selectively opened to drain any particulate matter that may accumulate at a bottom of the mixing tank 305. Moreover, the mixing tank 305 may be rounded to promote mixing of solids and fluids therein. The inlet 314 may be coupled to a pipe manifold, which may deliver the inlet fluid to the shakers 204-208 via risers 317, 318, 319. As such, the inlet 314 may not open into the mixing tank 305, but may keep fluids separate therein via pipes, which direct the fluid to the risers 317-319.

Figure 4:
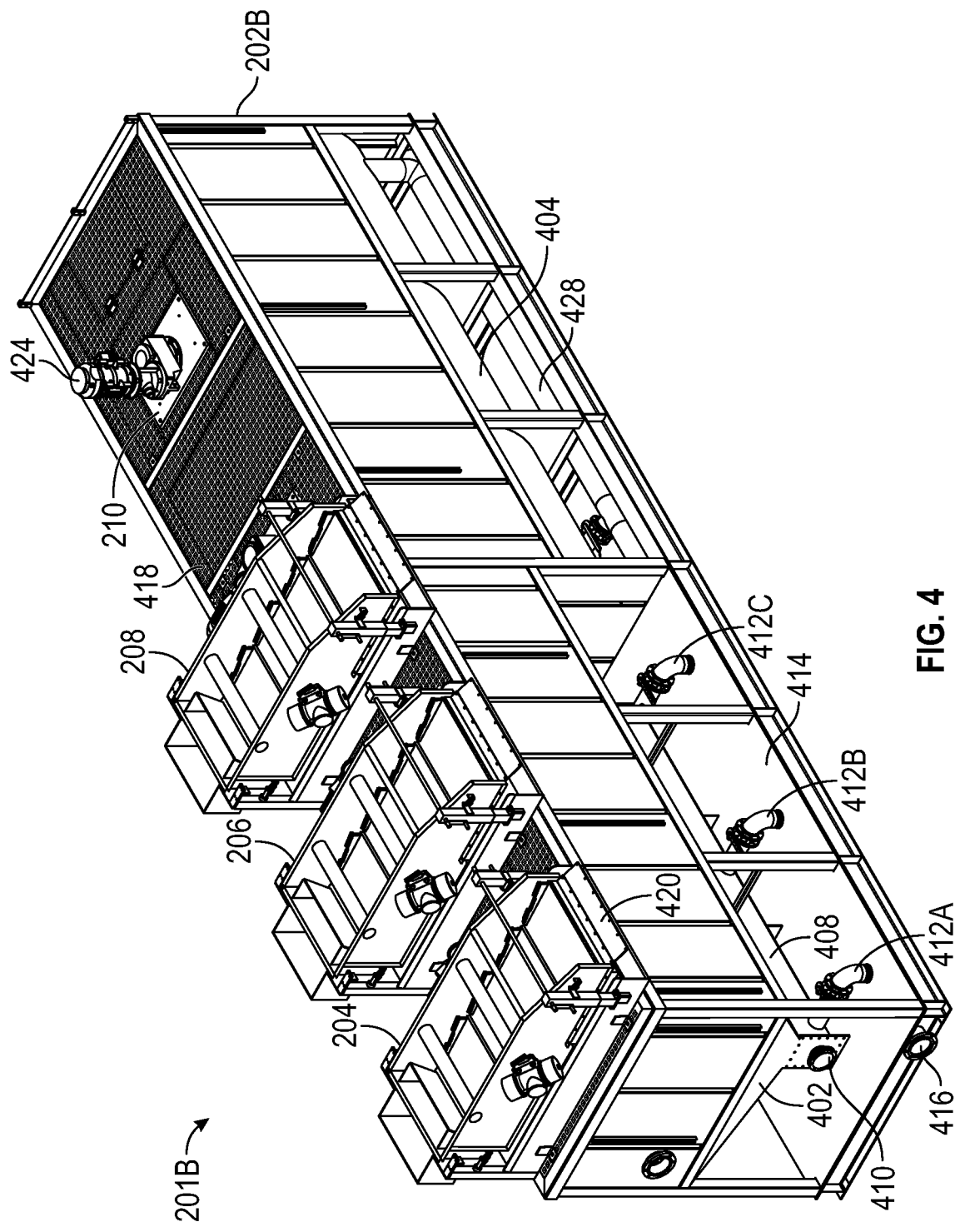
FIG. 4 illustrates a raised perspective view of a shaker assembly, according to an embodiment.
Figure 5:
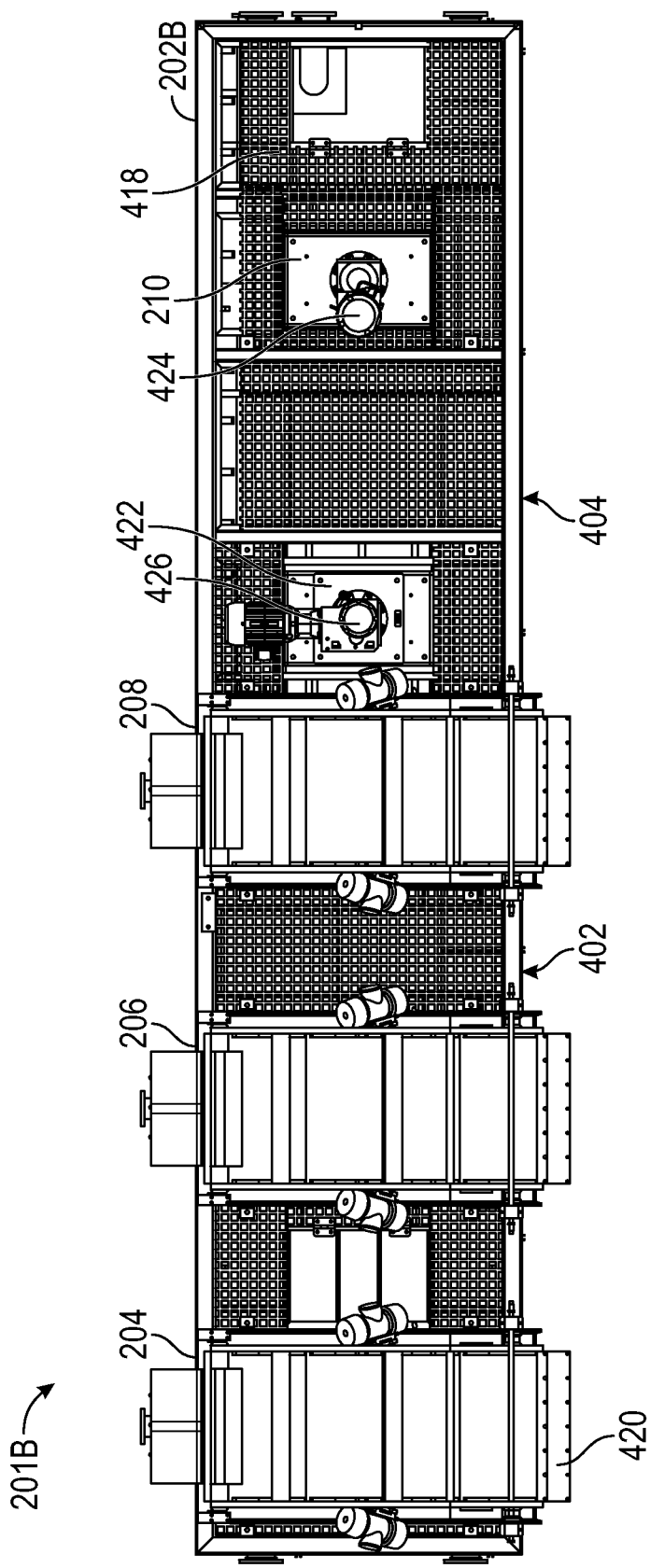
FIG. 5 illustrates a top plan view of the shaker assembly, according to an embodiment.

FIG. 4 illustrates a perspective view of the shaker assembly 201B, according to an embodiment. FIG. 5 illustrates a top, plan view of the shaker assembly 201B, according to an embodiment. Reference is now made to both FIGS. 4 and 5. The skid 202B of the shaker assembly 201B may be a frame structure that supports the other components of the shaker assembly 201B from the ground. A shaker tank 402 and a mixing tank 404 may be adjacent to one another and supported by the skid 202B (e.g., the tanks 402, 404 may be physically connected together and supported by the skid 2020B). The shaker tank 402 and the mixing tank 404 may be partitioned apart internally via an overflow weir, as will be described in greater detail below. The shaker tank 402 may have a conically-shape bottom, terminating with a lower trough 408, into which particulate matter may settle. An outlet 410 may be provided in the lower trough 408, through which such settled particulate matter may be removed from the tank 402. Additional outlets 412A, 412B, 412C may also be coupled to the lower trough 408, and may allow fluid from the shaker tank 402 to be evacuated into a pan 414, e.g., by opening valves, to avoid overflow. An outlet 416 may be positioned below the pan 414, and may be coupled to the mixing tank 404, as will be described in greater detail below.

At least one of the shakers (in this embodiment, shakers 204 and 206) may be positioned on top of the shaker tank 402, such that fluid flowing through the shakers 208 is received therefrom directly into the shaker tank 402. At least another one of the shakers (in this embodiment, shaker 208) may be positioned over the mixing tank 404. In normal operation, liquid (and some fine solids) that proceed through the shaker 208 may be directed through a mud ditch (not shown in this figure) positioned below the shaker 208, so as to transport the liquid (and entrained fine solids) into the shaker tank 402, rather than allowing the liquids to drop into the mixing tank 404.

Grates 418 may be positioned on the top of the tanks 402, 404, e.g., between the shakers 204-208 and the mixers 422, 424 e.g., to allow human operators to walk on the top of the tanks 402, 404. The grates 418 may also be configured to allow passage of small solids and fluids therethrough.

The shakers 204-208 may operate in parallel. That is, fluid flow upstream of the shakers 204-208 may be split through a header, e.g., into roughly even flow rates (e.g., mass or volume), and provided to the shakers 204-208 at the same time. The shakers 204-208 may then separate out larger particles from the liquid, e.g., via a vibrating screen. The liquid (and any remaining solids) may fall into a pan, which may eventually direct the liquid to the shaker tank 402. The separated solids may be directed out of an open end 420 of the shakers 204-208 and, e.g., into or may be transported to, the drying slab 122 (FIG. 1).

As noted above, at least one of the shakers (here, shaker 208) may be positioned over the mixing tank 404. In addition, as best shown in FIG. 5, two mixers 422, 424 may be positioned in the mixing tank 404, extending downward from the top thereof, and into the mixing tank 404. Specifically, in this embodiment, the mixer 424 is coupled to the mount 210, while the mixer 422 is coupled to a mount (e.g., plate) 426.

The mixing assembly 201B may also include a bypass outlet 228, which extends downward from the mixing tank 404 and extends along at least a portion of the mixing tank 404 and past the shaker tank 402, to the outlet 416. The outlet 416 may be connected to a pipe, which may communicate with the receiving pit 106, the drying slab 122, another tank, etc., e.g., to prevent overflow of the mixing tank 404.

Figure 6:
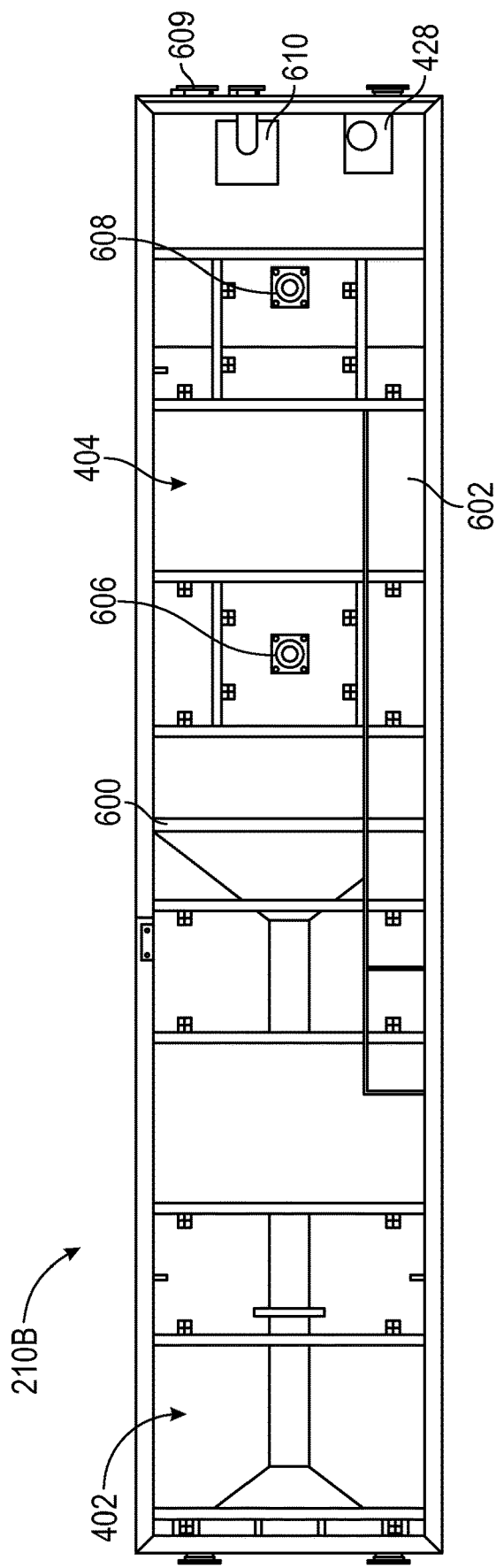
FIG. 6 illustrates a top plan view of the shaker assembly with certain components thereof removed to allowing viewing of an interior thereof, according to an embodiment.

FIG. 6 illustrates a top, plan view of the shaker assembly 201B, similar to FIG. 5, but with the grates 418, shakers 204-208, and mixers 422, 424 removed to enable viewing of the interior of the shaker assembly 201B, according to an embodiment. As mentioned above, the shaker tank 402 and the mixing tank 404 are partitioned by an overflow weir 600, which may be a wall having a top that is lower than the top of the shaker tank 402 and the mixing tank 404, such that fluid flows over the weir 600 from the shaker tank 402 to the mixing tank 404. In some embodiments, the weir 600 may include ports through a top thereof, e.g., instead of having a top that is lower than a top of the tanks 402, 404.

Further, as mentioned above, the shaker 208 (FIG. 4) may be positioned above the mixing tank 404 in order to provide a larger surface area to accept shakers 208 without expanding the footprint of the shaker tank 402. To support this feature, a mud ditch 602 is provided within the shaker assembly 201B, extending from the mixing tank 404 to the shaker tank 402 to transport separated liquids (and entrained fine solids) from the shaker 208 (and/or any other shakers positioned above the mixing tank 404) to the shaker tank 402. The provision of the mud ditch 602 may also allow for the shaker 208 to remain in operation, even when the shaker tank 402 is non-operational, by allowing for delivery of liquids directly from the shaker 208 to the mixing tank 404 without going through the shaker tank 402.

In addition, two mixer sleeve bases 606, 608 are shown, which are mounted to the bottom of the mixing tank 404. The sleeve bases 606, 608 may be fastened or welded to the bottom of the mixing tank 404, such that the sleeve bases 606, 608 are generally permanently affixed thereto. The sleeve bases 606, 608 may each be configured to receive a shaft of a respective one of the mixers 422, 424 (FIGS. 4 and 5), as will be described in greater detail below.

Further, a crossover connection 609 and a primary outlet 610 of the mixing tank 404 are visible in FIG. 6. The crossover connection 609 may be configured to connect to the mixing assembly 201A, so as to communicate fluid therewith. The primary outlet 610 may, in some embodiments, be positioned proximal to the vertical bottom of the mixing tank 404, and on an opposite side of the mixing tank 404 from the weir 600, e.g., to allow the mixers 422, 424 (e.g., FIG. 5) sufficient time to homogenize the fluid within the mixing tank 404 prior to receiving the liquid at the outlet 610. The primary outlet 610 may provide a conduit for removal of liquids from the mixing tank 404.

Figure 7:
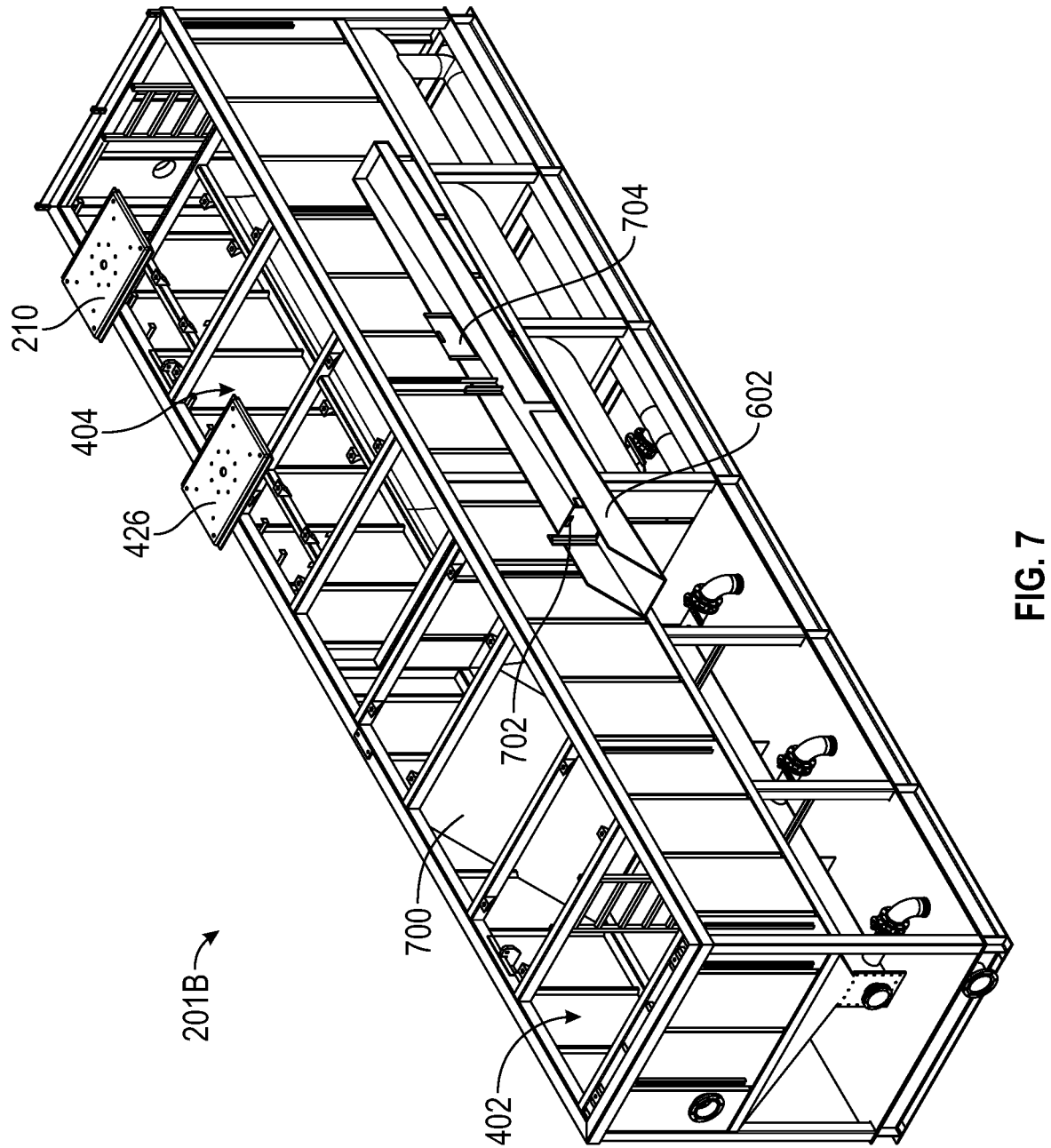
FIG. 7 illustrates a partially exploded, perspective view of the shaker assembly, according to an embodiment.
Figure 8:
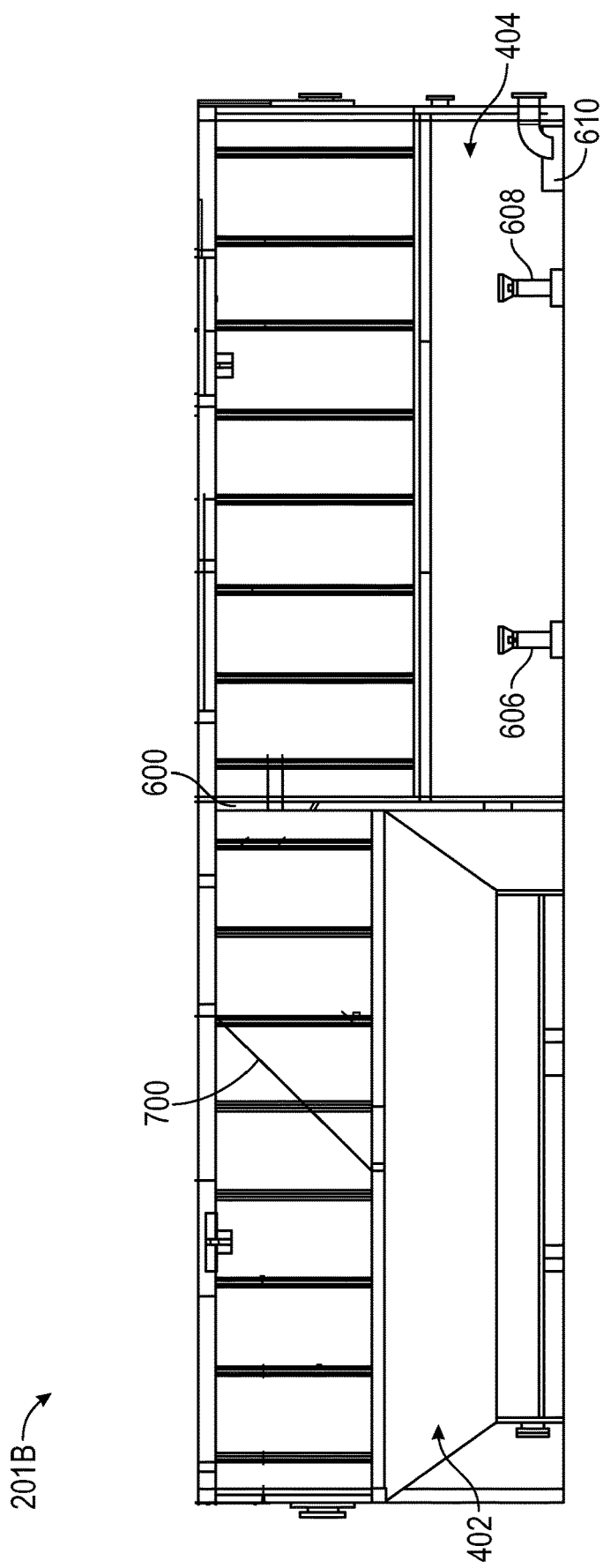
FIG. 8 illustrates a side, sectional view of the shaker assembly, according to an embodiment.

FIG. 7 illustrates an exploded, perspective view of the shaker assembly 201B, with the grates 418, shakers 204-208, and the mixers 422, 424 removed, according to an embodiment. Similarly, FIG. 8 shows a sectional view of the shaker assembly 201B, taken approximately lengthwise through the middle of the shaker assembly 201B, without the grates 418, shakers 204-208, or mixers 422, 424 being shown, according to an embodiment. Reference is now made to both FIGS. 7 and 8.

In addition to the overflow weir 600 discussed above, the shaker tank 402 may also include an underflow weir 700. For example, the underflow weir 700 may be spaced apart from the overflow weir 600. Further, the mud ditch 602 may extend past the underflow weir 700, such that materials deposited into the shaker tank 402 via the mud ditch 602 may flow past both weirs 600, 700 in order to reach the mixing tank 404.

In this view, it can be seen that the underflow weir 700 is angled, such that it extends farther way from the overflow weir 600 as proceeding downwards into the tank 402. Further, the top of the underflow weir 700 may be higher than the top of the overflow weir 600, such that, during normal operation of the shaker assembly 201B, the highest fluid level of the shaker tank 402 is below the top of the underflow weir 700, thereby avoiding allowing fluid to flow over the top of the underflow weir 700.

As also shown in FIG. 7, the mud ditch 602 is sloped downwards toward the shaker tank 402, consistent with its purposes of transporting liquid received from the shaker(s) positioned over the mixing tank 404 to the shaker tank 402. Further, the mud ditch 602 provides an additional capability, specifically, the shaker(s) 208 positioned over the mixing tank 404 may continue to operate temporarily even when the shaker tank 402 is "off-line" (e.g., empty) for maintenance. Accordingly, the mud ditch 602 may include a first door 702 and a second door 704. Although not shown, either or both doors 702, 704 may include handles to facilitate removal, or may be hinged, etc. The first door 702 may lead to the shaker tank 402, while the second door 704 may lead to the mixing tank 404. During normal operation, the first door 702 may be open and the second door 704 may be closed, so that the separated liquid from the shaker 208 flows into the shaker tank 402 and not into the mixing tank 404. However, if the shaker tank 402 is offline, the first door 702 may be closed, and the ditch 602 may thus serve to temporarily hold fluid received from the shaker 208. Further, the second door 704 may be opened to allow liquid from the shaker 208 to flow into the mixing tank 404, e.g., during extended outages of the shaker tank 402.

FIG. 8 also shows a side view of the sleeve bases 606, 608, which are separated apart along the length of the mixing tank 404. The bases 606, 608 may be positioned roughly in the middle of the mixing tank 404, and may be configured to receive a shaft and bearing assembly of the mixers 422, 424.

Figures 9, 10:
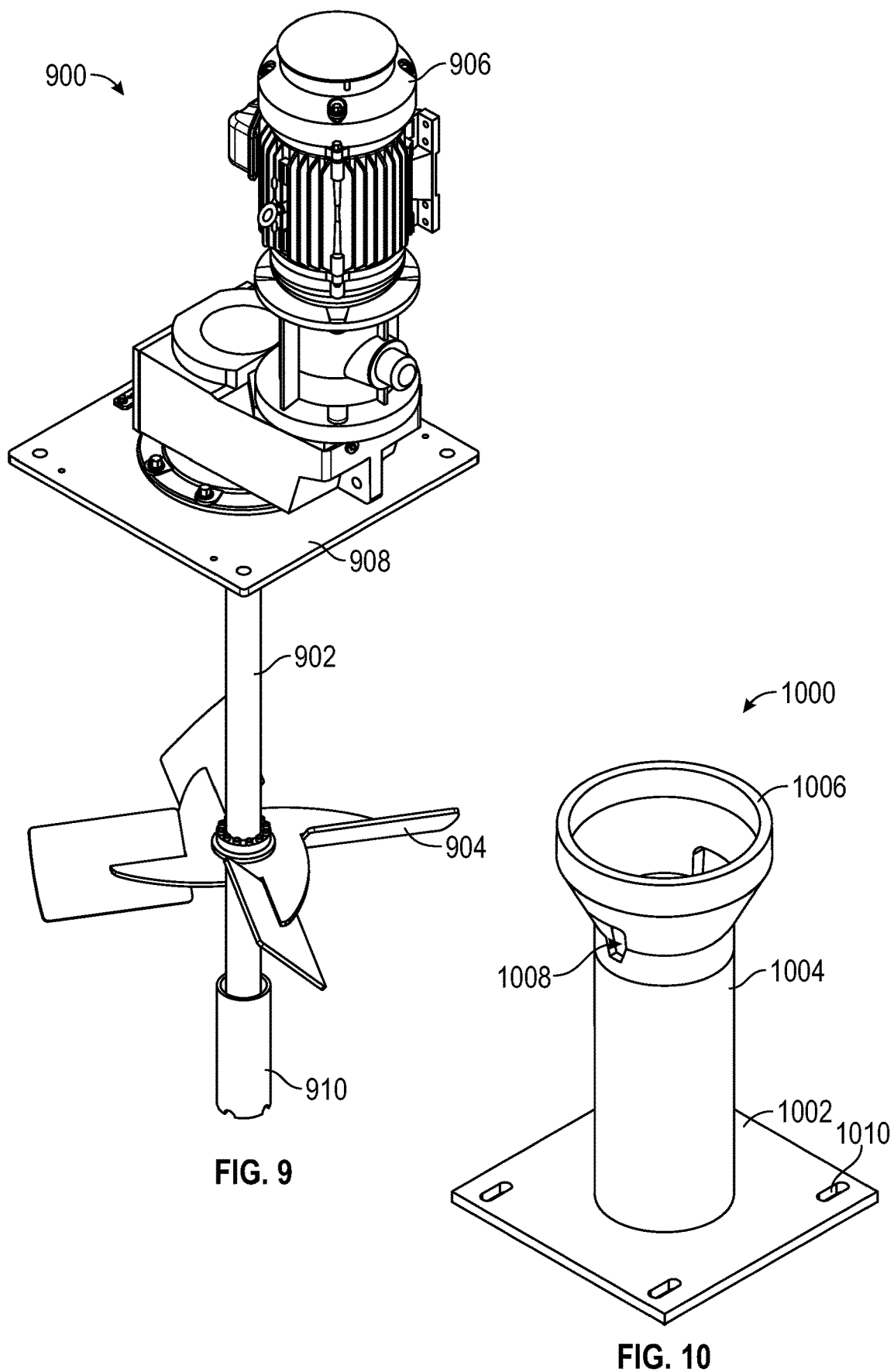
FIG. 9 illustrates a raised perspective view of a mixer, according to an embodiment.
FIG. 10 illustrates a raised perspective view of a base for the mixer, according to an embodiment.

FIG. 9 illustrates a perspective view of a mixer 900, according to an embodiment. The mixer 900 may be representative of an embodiment of any of the mixers discussed above. The mixer 900 may include a shaft 902 having an array of mixing paddles 904 attached thereto. A driver 906, such as an electric motor, may be coupled to the shaft 902, e.g., using a gear box, pulleys, etc. Further, the driver 906 may be attached to a mounting plate 908 (e.g., representing an embodiment of the mounting plates 210-214, 426 discussed above).

A bearing assembly 910 may be positioned at the distal end of the shaft 902, away from the driver 906. In some embodiments, the bearing assembly 910 may be a plain cylindrical sleeve, e.g., made from a low-friction material, so as to form a plain bearing with the base (described below). In another embodiment, the bearing assembly 910 may include two or more sleeves, e.g., with an inner sleeve received inside an outer sleeve and one or more roller bearings (or any other type of bearing) positioned therebetween.

When the mixer 900 is mounted onto the mixing assembly 201A and/or the shaker assembly 201B, the bearing assembly 910 may be slidably received into a base (e.g., bases 606, 608 of FIG. 6) that is welded or otherwise fixed to the bottom of the respective tank.

FIG. 10 illustrates a perspective view of a sleeve base 1000, into which the bearing assembly 910 may be received. As shown, the base 1000 may include a mounting plate 1002, a sleeve 1004 connected to and extending from the plate 1002, and a cone 1006. The mounting plate 1002 may be fixed to the bottom of a tank (e.g., the mixing tank 404). For example, the mounting plate 1002 may include holes for receiving fasteners therethrough, or may be welded to the bottom of the mixing tank 404.

The cone 1006 may include one or more (e.g., two) cutouts 1008, which may provide for access to an interior of the base 1000, e.g., to facilitate removal of debris therefrom. Further, the cone 1006 may be tapered, so as to direct the bearing assembly 910 of the mixer 900 into the sleeve 1004. For example, the bearing assembly 910 may be configured to slide into (i.e., is "slidable" into) the sleeve 1004, and the base 1000 may journal the shaft 902, providing lateral support thereto. The provision of the base 1000, which may have no moving parts, allows for quick removal, maintenance, and reintroduction/replacement of the mixer 900, e.g., potentially without draining the tank in which the base 1000 and mixer 900 are disposed.

Figure 11A:
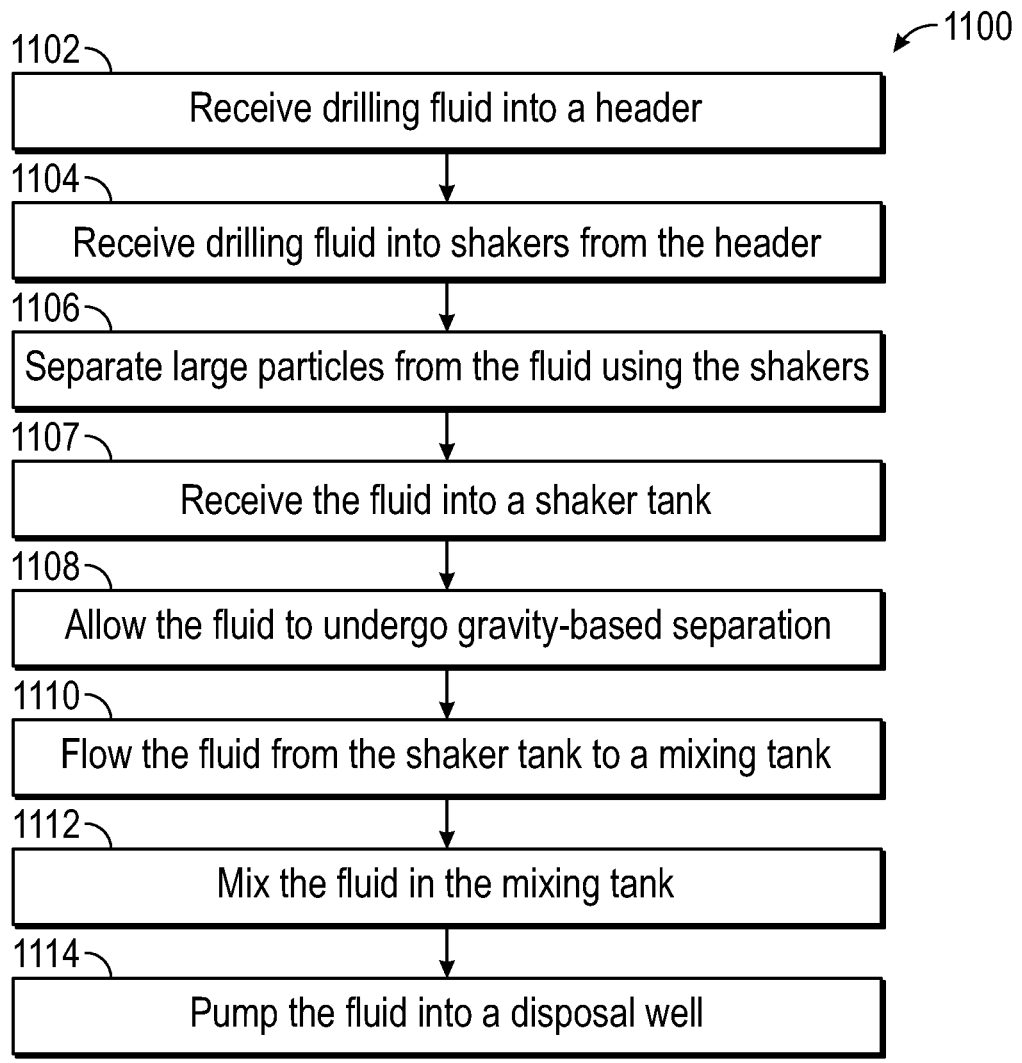
FIGS. 11A, 11B, and 11C illustrate flowcharts of methods for operating the mixing and shaking assembly, according to an embodiment.

Referring now to FIG. 11A, there is shown a flowchart of a method 1100 for separating solids from liquids, e.g., as part of a drilling fluid waste injection site, according to an embodiment. The method 1100 is described herein with reference to FIGS. 1-10 by way of example; however, it will be appreciated that embodiments of the method 1100 may operate using different structures and/or devices. Further, the steps of the method 1100 discussed herein may be combined, divided, or executed in a different order, without departing from the scope of the present disclosure.

The method 1100 may include receiving drilling fluid, e.g., from the receiving pit 106, to a header (e.g., connected between the inlet 314 and the risers 317-319) of a shaking and mixing system 200, as at 1102. The header may be positioned in or above a mixing assembly 201A of the system 200, but may be segregated from fluids in a tank of the mixing assembly 201A, as the header may be prevented from communication therewith. Rather, the header may be in communication with the shakers 204-208, such that the shakers 204 receive the fluid from the header in parallel, as at 1104.

The shakers 204-208 may separate large particles from the fluid received from the header, as at 1106. The larger particles may fall over the ramp 209 and into an appropriate receptacle (e.g., a drying pit). The fluids from the shakers 204-208 may be received into a shaker tank 402, as at 1107. As noted above, at least one of the shakers (e.g., shaker 208) may not be positioned over the shaker tank 402, but may be over an adjacent mixing tank 404. Thus, the fluid from the shaker 208 may be received into a mud ditch 602 extending over the mixing tank 404 and into the shaker tank 402, so as to shuttle the fluids from the shaker 208 to the shaker tank 402.

In the shaker tank 402, the fluids may be allowed to undergo gravity-based separation (e.g., sedimentation), as at 1108, by holding the fluids in the shaker tank 402 under relatively quiescent conditions. As such, at least some of the smaller particulate matter that was not separated in the shakers 204-208 settles out of suspension in the shaker tank 402. Further, the fluid in the shaker tank 402 flows under an underflow weir 700 and over an overflow weir 600, thereby ensuring that the fluid spends sufficient time in the shaker tank 402 before passing into the mixing tank 404.

Accordingly, the fluid flowing over the overflow weir 600 may be received into the mixing tank 404, as at 1110. In the mixing tank 404, mixers 422, 424 may be energized (e.g., powered on) to mix the fluid, as at 1112, promoting homogeneity thereof. Fluid in the mixing tank 404 may then be pumped from the mixing tank 404, as at 1114, and eventually into a disposal well.

Figure 11B:
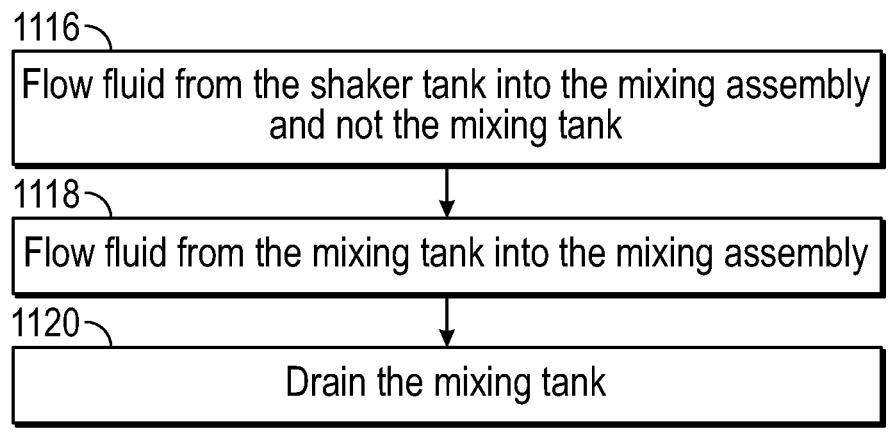

In at least some embodiments, the method 1100 may include taking the mixing tank 404 offline, as illustrated in FIG. 11B. In order to do so, fluid from the shaker tank 402 may be prevented from flowing into the mixing tank 404, and may instead be redirected to flow into the mixing assembly 201A via the crossover 203, as at 1116. As mentioned above, the crossover 203 may be proximal to the top of the shaker assembly 201B, and particularly, close to the top of the shaker tank 402. In addition, to bypass the shaker tank 402, the crossover 203 may be positioned lower than the overflow weir 600. Accordingly, the mixing assembly 201A may replace the capacity of mixing tank 404, e.g., when the mixing tank 404 is offline. Similarly, whether as part of draining the mixing tank 404 or for additional capacity during normal operations, at least some fluid may flow from the mixing tank 404 and into the mixing assembly 201A via the crossover connection 609, as at 1118. When fluid is not being routed into the mixing tank 404, the method 1100 may include draining the mixing tank 404 via the outlet conduit 428 and through the outlet 416, as at 1120.

Figure 11C:
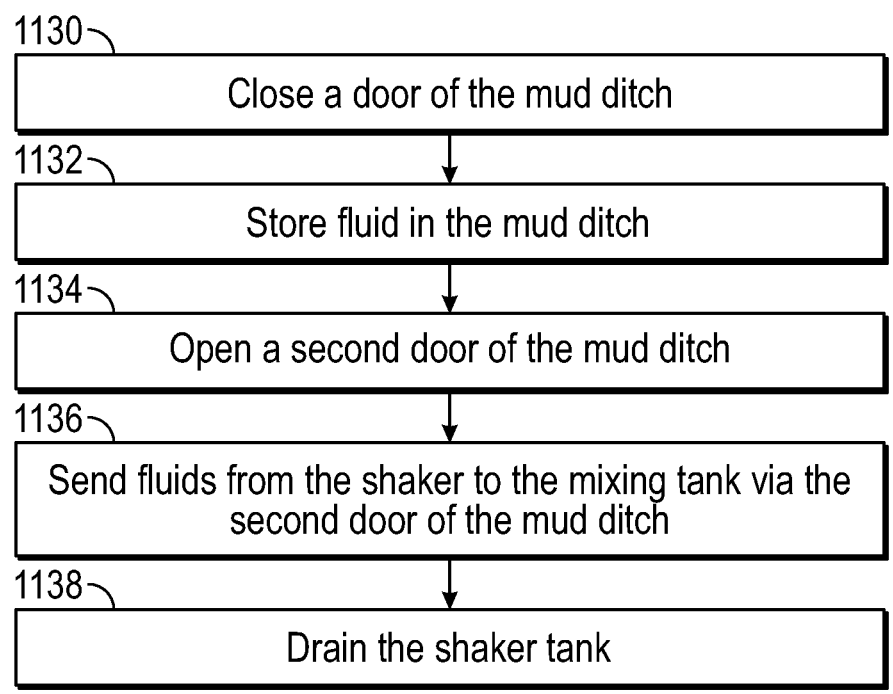

In at least one embodiment, the method 1100 may include taking the shaker tank 402 offline, as shown by way of example in the flowchart of FIG. 11C. In order to do so, the method 1100 may include redirecting the fluid from the shaker tank 402 to the mixing tank 404 and/or the mixing assembly 201A. For example, the method 1100 may include closing the first door 702 of the mud ditch 602, thereby preventing fluid flow from the shaker 208 to the shaker tank 402, as at 1130. The method 1100 may include storing fluid passed through the shaker 208 in the mud ditch 602, as at 1132. In some cases, the method 1100 may also include opening the second door 704, as at 1134, such that fluid from the shaker 208 is delivered into the mixing tank 404 and not the shaker tank 402, as at 1136.

The method 1100 may also include draining the shaker tank 402 and/or the mixing tank 404, e.g., for maintenance purposes, to remove excess particulates therefrom, etc., as at 1138. For example, the shaker tank 402 may be drained from the trough 408, to remove solids therefrom, as at 1138. For example, this may occur on demand, e.g., as through an outlet 410 and/or intermittently to avoid overflow via outlets 412 that direct the solids into a pan 414.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A shaker assembly, comprising:
   a shaker tank;
   a mixing tank in fluid communication with the shaker tank and positioned adjacent thereto;
   an overflow weir positioned between and separating the shaker tank and the mixing tank;
   a first shaker positioned over the shaker tank;
   a second shaker positioned over at least a portion of the shaker tank and at least a portion of the mixing tank, wherein the first and second shakers are configured to operate in parallel to partially separate a solid from a liquid of a drilling waste fluid, wherein, during normal operation, the liquid from the first shaker flows directly into the shaker tank, and the liquid from the second shaker is prevented from flowing directly into the mixing tank and instead flows into the shaker tank, and at least some of the liquid flows from the shaker tank over the overflow weir and into the mixing tank; and
   a mud ditch below the second shaker, wherein the liquid that flows through the second shaker falls directly into the mud ditch, and wherein the mud ditch is configured to transport the liquid to the shaker tank.

2. The shaker assembly of claim 1, wherein the mud ditch comprises a first door, wherein the first door is configured to be opened to allow the liquid to flow therethrough and to the shaker tank, and wherein the first door is configured to be closed to prevent the liquid from flowing therethrough into the shaker tank.

3. The shaker assembly of claim 2, wherein the mud ditch comprises a second door, wherein the second door is configured to be opened to allow the liquid to flow therethrough and into the mixing tank, and wherein the second door is configured to be closed to prevent the liquid from flowing therethrough into the mixing tank.

4. The shaker assembly of claim 1, further comprising an underflow weir positioned in the shaker tank, wherein the underflow weir is positioned such that the liquid in the mixing tank flows under the underflow weir and over the overflow weir to reach the mixing tank.

5. The shaker assembly of claim 1, wherein the shaker tank comprises a crossover, and wherein the crossover is configured to be opened to prevent the liquid from flowing from the shaker tank and into the mixing tank.

6. The shaker assembly of claim 1, wherein the mixing tank comprises a bypass outlet, wherein the bypass outlet extends along at least a portion of a length of the mixing tank and at least a portion of a length of the shaker tank.

7. The shaker assembly of claim 1, wherein the shaker tank comprises a tapered bottom and a trough in communication with the tapered bottom, and wherein the shaker tank comprises a primary outlet in communication with the trough, for evacuation of the solid accumulated in the shaker tank.

8. The shaker assembly of claim 1, further comprising a plurality of mixers positioned at least partially in the mixing tank.

9. The shaker assembly of claim 8, further comprising a plurality of sleeve bases fixed to a bottom of the mixing tank, wherein an end of a shaft of each of the plurality of mixers is slidable into and removable from the plurality of sleeve bases.

10. The shaker assembly of claim 9, wherein the bottom of the mixing tank is rounded.

11. The shaker assembly of claim 9, wherein the plurality of sleeve bases each comprise a cutout providing access to an interior of the plurality of sleeve bases.

12. The shaker assembly of claim 9, wherein the plurality of mixers each include a driver, a shaft coupled to the driver, and a bearing assembly coupled to the shaft, opposite to the driver, wherein the bearing assembly is configured to be received into an interior of one of the plurality of sleeve bases.

13. A method for disposing of drilling fluid waste, comprising:
   receiving the drilling fluid waste in a receiving pit;
   receiving at least a portion of the drilling fluid waste from the receiving pit into a first shaker and a second shaker of a shaker assembly, wherein the shaker assembly further comprises:
   a shaker tank;
   a mixing tank in fluid communication with the shaker tank and positioned adjacent thereto;
   a mud ditch in fluid communication with the shaker tank and the mixing tank; and
   an overflow weir positioned between and separating the shaker tank and the mixing tank,
   wherein the first shaker is positioned over the shaker tank,
   wherein the second shaker is positioned over the mixing tank,
   wherein the mud ditch is positioned below the second shaker, and
   wherein the first and second shakers are configured to operate in parallel to separate a solid from a liquid of the drilling waste fluid;
   receiving the liquid from the first and second shakers into the shaker tank, wherein the liquid from the first shaker flows directly into the shaker tank, and the liquid from the second shaker is prevented from flowing directly into the mixing tank and instead falls into the mud ditch and flows through the mud ditch into the shaker tank;
   receiving the liquid from the shaker tank into the mixing tank, wherein the liquid from the shaker tank flows over the overflow weir and into the mixing tank;
   mixing the liquid in the mixing tank; and
   pumping the liquid into a disposal well.

14. The method of claim 13, further comprising:
stopping fluid flow from the shaker tank into the mixing tank by redirecting the liquid in the shaker tank to a mixing assembly; and
flowing the liquid in the mixing tank into the mixing assembly,
wherein pumping the liquid into the disposal well comprises pumping the liquid from the mixing assembly.

15. The method of claim 13, further comprising stopping the liquid from flowing from the first and second shakers to the shaker tank at least partially by redirecting the liquid from at least one of the first shaker or the second shaker to the mixing tank and not into the shaker tank.

16. The method of claim 15, wherein redirecting the liquid from the at least one of the first shaker or the second shaker comprises closing a door of the mud ditch, wherein, when the door is open, the mud ditch delivers the liquid from the second shaker to the shaker tank, and when the door is closed, the mud ditch is prevented from delivering the liquid from the second shaker to the shaker tank.

17. The method of claim 13, wherein mixing the liquid comprises energizing a mixer positioned at least partially in the mixing tank, wherein the mixer comprise a driver positioned above a top of the mixing tank, a shaft extending downward from the driver and into the mixing tank, and a bearing assembly coupled to the shaft, wherein the bearing assembly is configured to be slidably positioned in, and at least partially rotatable with respect to, a base sleeve that is fixed to a bottom of the mixing tank.

18. The method of claim 17, further comprising removing the driver, the shaft, and the bearing assembly as a single unit from within the mixing tank, wherein the base sleeve remains fixed to the bottom of the mixing tank.

19. The shaker assembly of claim 1, wherein the liquid that flows through the second shaker falls directly into the mud pit instead of the shaker tank.

20. A shaker assembly, comprising:
a shaker tank;
a mixing tank in fluid communication with the shaker tank and positioned adjacent thereto;
an overflow weir positioned between and separating the shaker tank and the mixing tank;
a first shaker positioned over the shaker tank; and
a second shaker positioned over at least a portion of the shaker tank and at least a portion of the mixing tank,
wherein the first and second shakers are configured to operate in parallel to partially separate a solid from a liquid of a drilling waste fluid, wherein, during normal operation, the liquid from the first shaker flows directly into the shaker tank, and the liquid from the second shaker is prevented from flowing directly into the mixing tank and instead flows into the shaker tank, and at least some of the liquid flows from the shaker tank over the overflow weir and into the mixing tank.

* * * * *